United States Patent
Takizawa (10) Patent No.: US 12,252,633 B2
(45) Date of Patent: *Mar. 18, 2025

(54) POLISHING LIQUID AND METHOD FOR MANUFACTURING GLASS SUBSTRATE

(71) Applicant: HOYA CORPORATION, Tokyo (JP)

(72) Inventor: Toshio Takizawa, Akishima (JP)

(73) Assignee: HOYA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,385

(22) Filed: May 22, 2023

(65) Prior Publication Data

US 2023/0287244 A1     Sep. 14, 2023

Related U.S. Application Data (63) Continuation of application No. 17/566,200, filed on Dec. 30, 2021, now Pat. No. 11,680,187, which is a continuation of application No. 16/641,185, filed as application No. PCT/JP2018/040610 on Oct. 31, 2018, now Pat. No. 11,214,713.

(30) Foreign Application Priority Data

Oct. 31, 2017 (JP) .................................. 2017-210817

(51) Int. Cl.
    C09G 1/02       (2006.01)
    B24B 7/24       (2006.01)
    C03C 17/00      (2006.01)
    C09K 3/14       (2006.01)
    (Continued)

(52) U.S. Cl.
CPC ................ *C09G 1/02* (2013.01); *B24B 7/241* (2013.01); *B24B 7/245* (2013.01); *C03C 17/002* (2013.01); *C09K 3/1454* (2013.01); *G11B 5/73921* (2019.05); *G11B 5/8404* (2013.01)

(58) Field of Classification Search
CPC ....................................................... C09G 1/02
See application file for complete search history.

(56) References Cited

U.S. PATENT DOCUMENTS

| | | |
|---|---|---|
| 8,938,990 B2 | 1/2015 | Nakae et al. |
| 11,214,713 B2 | 1/2022 | Takizawa |

(Continued)

FOREIGN PATENT DOCUMENTS

| | | |
|---|---|---|
| CN | 101486879 A | 7/2009 |
| CN | 102079950 A | 6/2011 |

(Continued)

OTHER PUBLICATIONS

International Search Report in PCT/JP2018/040610 dated Dec. 4, 2018.

(Continued)

*Primary Examiner* — William D Young
(74) *Attorney, Agent, or Firm* — Global IP Counselors, LLP (57) ABSTRACT

Letting a particle diameter be Dx (μm) when a cumulative particle volume cumulated from the small particle diameter side reaches x (%) of the total particle volume in a particle size distribution obtained regarding cerium oxide included in a polishing liquid using a laser diffraction/scattering method, D5 is 1 μm or less, D100 is 3 μm or more, D50 is 0.8 to 2.4 μm, and Dpeak−D5 is less than D95−Dpeak.

16 Claims, 1 Drawing Sheet

(51) Int. Cl.
*G11B 5/73* (2006.01)
*G11B 5/84* (2006.01)

(56) References Cited

U.S. PATENT DOCUMENTS

| | | |
|---|---|---|
| 2003/0000150 A1 | 1/2003 | Ito et al. |
| 2004/0031206 A1* | 2/2004 | Uchino ............... C09K 3/1436 51/307 |
| 2011/0123831 A1 | 5/2011 | Sakai et al. |
| 2011/0240594 A1 | 10/2011 | Hamaguchi et al. |
| 2013/0123152 A1 | 5/2013 | Stephens et al. |
| 2015/0213826 A1 | 7/2015 | Itaya et al. |
| 2016/0200944 A1 | 7/2016 | Zhou et al. |
| 2017/0133236 A1 | 5/2017 | Murella et al. |
| 2020/0115590 A1 | 4/2020 | Zhou et al. |

FOREIGN PATENT DOCUMENTS

| | | |
|---|---|---|
| CN | 104137181 A | 11/2014 |
| CN | 104603878 A | 5/2015 |
| CN | 106479371 A | 3/2017 |
| JP | 2002180034 A | 6/2002 |
| JP | 2021180034 A | 6/2002 |
| JP | 2002301655 A | 10/2002 |
| JP | 2002371267 A | 12/2002 |
| JP | 2008284679 A | 11/2008 |
| JP | 2012020377 A | 2/2012 |
| JP | 2014197449 A | 10/2014 |
| JP | 2018506618 A | 3/2018 |
| WO | 0228979 A1 | 4/2002 |
| WO | 2013069720 A1 | 5/2013 |
| WO | WO 2013-069720 * | 5/2013 |
| WO | 2014168113 A1 | 10/2014 |
| WO | 2016002825 A1 | 1/2016 |

OTHER PUBLICATIONS

Office Action translated into Japanese in the corresponding Chinese Patent Application No. 201880060448.9, dated Feb. 26, 2021.
Documenl#1 https://www.horiba.com/uk/scientific/products/particle-characterization/education/general-information/data-interpretation/understanding-particle-size-distribution-calculations/ (Year: NA).

* cited by examiner

POLISHING LIQUID AND METHOD FOR MANUFACTURING GLASS SUBSTRATE

CROSS-REFERENCE TO RELATED APPLICATIONS

This application is a continuation application of U.S. patent application Ser. No. 17/566,200, filed on Dec. 30, 2021, which is a continuation application of U.S. patent application Ser. No. 16/641,185, filed on Feb. 21, 2020, now U.S. Pat. No. 11,214,713, which is a U.S. National stage application of International Patent Application No. PCT/JP2018/040610, filed on Oct. 31, 2018, which claims priority to Japanese Patent Application No. 2017-210817, filed in Japan on Oct. 31, 2017. The entire contents of U.S. patent application Ser. Nos. 17/566,200 and 16/641,185, and Japanese Patent Application No. 2017-210817 are hereby incorporated herein by reference.

BACKGROUND

Field of the Invention

The present invention relates to a polishing liquid that contains cerium oxide as loose abrasive particles and is used in polishing processing for polishing a surface of a glass substrate, a method for manufacturing a glass substrate with use of this polishing liquid, and a method for manufacturing a magnetic disk.

Background Information

Nowadays, in order to record data, hard disk drives (HDDs) are incorporated in personal computers, DVD (Digital Versatile Disc) recording apparatuses, and the like.

A magnetic disk obtained by providing a magnetic layer on a substrate is used in a hard disk drive, and magnetic recording information is recorded in or read from the magnetic layer with a magnetic head that is slightly away from the surface of the magnetic disk. In order to increase the storage capacity in recent hard disk apparatuses, attempts have been made to increase the magnetic recording density. In order to make it possible to increase the magnetic recording density, surface unevenness of main surfaces of a glass substrate to be used as a magnetic-disk substrate needs to be reduced as much as possible. Also, accompanying this, there is demand for also making surface unevenness of inner and outer circumferential edge surfaces of a glass substrate as small as possible so that no microparticles adhere to the slight gaps formed between protrusions and recesses of the edge surfaces scatter and are transferred to the main surfaces of the glass substrate.

Incidentally, if processing for polishing a glass substrate is performed, there are cases where cerium oxide is used as loose abrasive particles. Cerium oxide is used as loose abrasive particles in one process for polishing a main surface of a glass substrate, and in processing for polishing inner and outer circumferential edge surfaces of a glass substrate, for example.

When a magnetic-disk glass substrate is manufactured, for example, inner and outer circumferential edge surfaces of a glass material are chamfered, and then, inner and outer circumferential edge surface mirror processing is performed through brush polishing with use of a brush and a polishing liquid that contains cerium oxide as loose abrasive particles (e.g., JP 2012-20377A).

SUMMARY

If such cerium oxide is used as loose abrasive particles in a polishing liquid, the polishing rate may decrease even if polishing processing is performed under the same polishing processing conditions. In this case, polishing processing conditions need to be changed according to changes in the polishing rate. Also, there is an issue regarding a production efficiency, such as a need to increase the frequency of replacing a polishing liquid that contains cerium oxide with a new polishing liquid. Also, because cerium oxide is relatively expensive, increasing the frequency of replacement will increase production costs.

In view of this, an object of the present invention is to provide a polishing liquid that can be repeatedly used in polishing processing for a long time and in which even if a polishing liquid containing cerium oxide as loose abrasive particles is repeatedly used in polishing processing for polishing a glass substrate with use of the polishing liquid, a change in the polishing rate is slight, and also to provide a method for manufacturing a glass substrate with use of this polishing liquid, and a method for manufacturing a magnetic disk.

One aspect of the present invention is a polishing liquid that contains cerium oxide as loose abrasive particles and is to be used in polishing processing for polishing a surface of a glass substrate.

Letting a particle diameter be Dx [μm] when a cumulative particle volume cumulated from the small particle diameter side reaches x [%] of a total particle volume in a particle size distribution obtained regarding the cerium oxide using a laser diffraction/scattering method, D5 is 1 μm or less, D100 is 3 μm or more, D50 is 0.8 to 2.4 μm, and Dpeak−D5 is less than D95−Dpeak.

It is preferable that the D95 is 7 μm or less.

It is preferable that a difference between the D95 and the D5 is 3 μm or more.

It is preferable that the polishing liquid is used in polishing processing for polishing an edge surface of a glass substrate with use of a brush.

Another aspect of the present invention is a method for manufacturing a glass substrate, the method including processing for polishing a surface of a substrate. The polishing in this manufacturing method is processing for polishing the glass substrate with use of the polishing liquid.

It is preferable that the glass substrate is a magnetic-disk glass substrate.

According to the above-described polishing liquid, even if the polishing liquid containing cerium oxide as loose abrasive particles is repeatedly used in polishing processing for polishing a glass substrate with use of the polishing liquid, a change in the polishing rate is slight, and it is possible to repeatedly use this polishing liquid in polishing processing for a long time. Thus, even if the above-described polishing liquid is repeatedly used in polishing processing, the frequency of changing the polishing processing conditions is low, and the same polishing liquid can be used in polishing processing for a long time. According to the above-described glass substrate manufacturing method and magnetic disk manufacturing method, polishing processing can be stably performed with use of the above-described polishing liquid, and thus it is possible to stably manufacture glass substrates and magnetic disks.

DETAILED DESCRIPTION OF THE EMBODIMENTS

Hereinafter, a polishing liquid, a method for manufacturing a glass substrate, and a method for manufacturing a magnetic disk according to an embodiment of the present invention will be described in detail. Note that the method for manufacturing a glass substrate according to this embodiment is suitable for manufacturing a magnetic-disk glass substrate having a nominal size of 2.5 to 3.5 inches (e.g., having a diameter of 53 to 98 mm), and having a substrate thickness of 0.3 to 2.0 mm, for example.

The inventor of the present invention found that, when the inventor studied polishing processing in which a polishing liquid containing cerium oxide as loose abrasive particles was used, cerium oxide particles included relatively fragile particles, and abrasive particles were broken by polishing processing and a particle size distribution was likely to change. If a polishing liquid is repeatedly used in polishing processing, a large particle is divided into two, for example, and the ratio of relatively small particles rapidly increases. Note that the inventor also found that, usually, the frequency of large particles was not completely zero because some particles were very hard and unbreakable. It is inferred that, even if a large particle breaks, a small particle having a particle diameter of 1 μm or less is likely to separate from the large particle to be peeled off, instead of the large particle being divided at the center thereof into two with the substantially equivalent size, and a large particle is yet maintained. That is, a particle size distribution showing the frequency with respect to the particle diameter of cerium oxide changes to a broad particle size distribution spreading toward the small particle diameter side because as the distribution spreads toward the small particle diameter side, the frequency rapidly increases, and the frequency on the large particle diameter side decreases. Thus, the inventor found that it was difficult to maintain, for a long time, a polishing rate at the beginning of use using a polishing liquid with a uniform particle diameter, that is, a polishing liquid in which the frequency of particle diameters is concentrated in a narrow range of the particle diameter.

The inventor examined, based on such findings, a change in the polishing rate of a polishing liquid at the beginning of use by changing a frequency distribution (a particle size distribution) of particle diameters of cerium oxide in various ways. As a result, the inventor found that as a result of using, in a polishing liquid, cerium oxide with a predetermined distribution that somewhat includes a small particle diameter region, the predetermined distribution being a particle size distribution of loose abrasive particles that is broader than a conventional particle size distribution, even if polishing processing is repeated, the influence of a change in the particle size distribution can be reduced, and a change in the polishing rate is small, and such a polishing liquid can be repeatedly used in polishing processing for a long time. The inventor found a polishing liquid having the following aspects under such a background.

Although a glass blank that has undergone shape processing performed when a magnetic-disk glass substrate is manufactured will be described mainly as a substrate to be subjected to polishing processing with use of a polishing liquid in the following description, the substrate to be subjected to polishing processing is not limited to a glass blank for a magnetic-disk glass substrate, and there is no particular limitation on a substrate to be subjected to polishing processing as long as a substrate is a glass substrate on which polishing processing is performed using cerium oxide as loose abrasive particles. Examples thereof include main surfaces of a glass blank on which edge surface polishing processing has been performed, that is, main surfaces of an intermediate glass substrate, and main surfaces of a glass substrate for a mask blank, a glass substrate for liquid crystal, a glass substrate for cover glass, and glass for an optical component such as a lens. A glass blank or an intermediate glass substrate will be collectively referred to as a "glass substrate" hereinafter, but will also be referred to as a "glass blank" or an "intermediate glass substrate" as needed.

In a process for manufacturing a magnetic-disk glass substrate, surface unevenness is reduced through processing for polishing main surfaces or inner and outer circumferential edge surfaces of a glass substrate. In such a case, cerium oxide is used in a polishing liquid as loose abrasive particles. The particle diameter of loose abrasive particles is somewhat limited according to a polishing rate and the required quality of a polished surface, and an average particle diameter thereof is set. However, the polishing rate changes as a result of such loose abrasive particles being used in polishing processing for a long time. The polishing rate is likely to change depending on the particle diameter of loose abrasive particles, and in particular, the polishing rate is likely to significantly decrease because cerium oxide used as loose abrasive particles include particles that are likely to break.

As described above, a decrease in the polishing rate is caused by the fact that cerium oxide particles with a large particle diameter that make large contributions to a polishing rate are broken through polishing processing to become small particles and the particle diameter frequency distribution changes. Thus, if cerium oxide that has a particle diameter frequency distribution that does not significantly change even if cerium oxide particles having a large particle diameter are broken by performing polishing processing is used and polishing processing conditions are set, even if polishing processing is repeated with use of this polishing liquid, a change in the particle size distribution can be reduced, and a change in the polishing rate can be reduced.

A polishing liquid used in polishing processing of one embodiment is as follows.

Letting a particle diameter (the diameter of abrasive particles) be Dx [μm] when a cumulative particle volume cumulated from the small particle diameter (microparticles) side reaches x [%] of a total particle volume in a particle size distribution obtained regarding cerium oxide included in the polishing liquid using a laser diffraction/scattering method, D5 is 1 μm or less, and a difference between D95 and D5 is 3 μm or more.

In other words, when a particle diameter cumulative frequency obtained by cumulating the frequency from the minimum particle diameter of cerium oxide to a predetermined particle diameter in a particle size distribution (a particle size distribution based on volume) that indicates the frequency [%] with respect to the particle diameter of cerium oxide included in the polishing liquid is x [%] (x indicates a number of 0 to 100 inclusive) and a predetermined particle diameter is Dx [μm], D5 is 1 μm or less, and a difference between D95 and D5 is 3 μm or more.

Even if such a polishing liquid is repeatedly used in polishing processing for a long time, a decrease in the polishing rate is small, the frequency of changing the polishing processing conditions can be reduced, and the same polishing liquid can be repeatedly used for a long time. Thus, polishing processing can be stably performed with use of the above-described polishing liquid, and thus it is possible to stably manufacture glass substrates and magnetic disks. Also, a decrease in the quality of a polished surface is small even if such a polishing liquid is repeatedly used in polishing processing for a long time, and the frequency of changing the polishing processing conditions can be reduced. Thus, the same polishing liquid can be repeatedly used for a long time, and thus it is possible to stably perform polishing processing with use of the above-described polishing liquid, and to stably manufacture glass substrates and magnetic disks. The surface quality refers to the degree of unevenness of a polished surface or the number of defects such as pits and scratches when polishing is performed at the same polishing machining allowance amount. A low surface quality refers that unevenness of a polished surface is high, or the number of defects such as pits and scratches is high.

If a magnetic-disk glass substrate has an outer circumferential diameter of 94 mm or more (a nominal size of 3.5 inches or more), an edge surface polishing amount increases due to the outer circumferential surface being longer, compared to a conventional nominal size of 2.5 inches or less (e.g., the outer circumferential diameter is 53 to 68 mm), and thus the polishing rate decreases, and the frequency of replacement of the polishing liquid also increases. Thus, the amount of the consumed polishing liquid increases and productivity significantly decreases. However, use of the polishing liquid of this embodiment makes it possible to minimize a decrease in the productivity of glass substrates.

Also, a magnetic-disk glass substrate more preferably has a substrate thickness of 0.3 to 0.64 mm. If edge surface polishing processing is performed with use of a brush, for example, the thinner the substrate is, the more difficult to carry out edge surface polishing, and it is important to repeatedly supply a polishing liquid. Thus, the polishing liquid of this embodiment with a particle size distribution of loose abrasive particles being restricted taking a change in the polishing rate into consideration has a large effect on suppressing a decrease in productivity in the case where a substrate has a thickness of 0.3 to 0.64 mm.

Hereinafter, a glass substrate on which polishing processing is performed with use of the above-described polishing liquid will be described. In the following description, an example in which inner and outer circumferential edge surfaces of a glass substrate are polished mainly as surfaces of a glass substrate to be subjected to polishing processing will be described. However, surfaces of a glass substrate to be subjected to polishing processing may be main surfaces (surfaces with the largest area) of the glass substrate.

Magnetic-disk glass substrate A magnetic-disk glass substrate has a circular plate shape, and a central hole having a circular shape concentric with the outer circumference is hollowed out so that the magnetic-disk glass substrate has a ring shape. A magnetic disk is formed by forming magnetic layers (recording regions) in annular regions of both surfaces of the magnetic-disk glass substrate.

The glass blank for a magnetic disk (hereinafter simply referred to as "glass blank") is a circular glass plate produced through press molding, for example, and is in a form in which the central hole has not yet been hollowed out. Also, a glass blank can be taken out from a glass plate obtained using a float method or a downdraw method, and in this case, a glass blank may be obtained by forming a central hole when taking out a glass blank.

Aluminosilicate glass, soda-lime glass, borosilicate glass, and the like can be used as a material of the glass blank. In particular, aluminosilicate glass can be suitably used in light of the fact that chemical strengthening can be carried out, and a magnetic-disk glass substrate with better flatness of main surfaces and substrate hardness can be produced.

Method for manufacturing magnetic-disk glass substrate Next, a method for manufacturing a magnetic-disk glass substrate will be described.

First, a glass blank that is a raw material for a plate-shaped magnetic-disk glass substrate having a pair of main surfaces is produced through press molding (press-molding processing). Then, a circular hole is formed in a central portion of the produced glass blank, and the resulting glass blank has a ring shape (annular shape) (circular hole formation processing), and then, shaping is performed (shape processing). Accordingly, a glass substrate (a glass blank) having chamfered surfaces is produced. Then, polishing is performed on inner and outer circumferential edge surfaces of the glass substrate (the glass blank) that has been subjected to shaping (edge surface polishing processing). Grinding with fixed abrasive particles is performed on the main surfaces of the glass substrate on which edge surface polishing has been performed, that is, the main surfaces of the intermediate glass substrate (grinding processing). Then, first polishing is performed on the main surfaces of the glass substrate (the intermediate glass substrate) (first polishing processing). Then, chemical strengthening is performed on the glass substrate (the intermediate glass substrate) (chemical strengthening processing). Note that chemical strengthening processing need not be performed. Then, second polishing is performed on the chemically strengthened glass substrate (the intermediate glass substrate) (second polishing processing). A glass substrate that is a source of a magnetic disk (a glass substrate as a final product) can be obtained through the above-described processing. Hereinafter, each process will be described in detail.

(a) Press-Molding Processing

A glass blank is molded by cutting a leading end of a molten glass flow with use of a cutter, and pressing the mass of the cut molten glass between press molding surfaces of a pair of molds. After pressing is performed for a predetermined time, the molds are opened to remove the glass blank.

(b) Circular Hole Formation Processing

A disk-shaped glass substrate (a glass blank) having a circular hole can be obtained by forming the circular hole in the glass blank with use of a drill or the like. A circular hole is formed by forming a scribe line on a main surface of the glass blank in a circular shape with use of a scriber, applying heat to extend a crack along the scribe line, and separating a circular inner portion, for example.

(c) Shape Processing

In the shape processing, chamfering processing is performed on an end portion of the glass substrate (the glass blank) that has undergone circular hole formation processing. Chamfering is performed with use of a formed grindstone, for example.

(d) Edge Surface Polishing Processing

In the edge surface polishing processing, finishing is performed on the inner and outer circumferential side edge surfaces of the glass substrate (the glass blank) through brush polishing. At this time, a polishing liquid containing cerium oxide microparticles having a predetermined particle size distribution as loose abrasive particles, that is, as polishing abrasive particles, is used. The cerium oxide particle size distribution will be described later. It is preferable that the edge surfaces of the glass substrate (the glass blank) become mirror surfaces through this polishing processing. The glass blank that was subjected to edge surface polishing processing is an intermediate glass substrate.

(e) Grinding Processing

In the grinding processing, grinding processing is performed on the main surfaces of the glass substrate that was subjected to edge surface polishing processing, that is, the main surfaces of the intermediate glass substrate, using a double-side grinding apparatus provided with a planetary gear mechanism. Specifically, two main surfaces of the glass substrate (the intermediate glass substrate) are ground while the outer circumferential edge surface of the glass substrate (the intermediate glass substrate) is held in a holding hole provided in a holding member of the double-side grinding apparatus. The double-side grinding apparatus has a pair of upper and lower surface plates (an upper surface plate and a lower surface plate), and the glass substrate is held between the upper surface plate and the lower surface plate. Then, the two main surfaces of the glass substrate can be ground by moving the glass substrate (the intermediate glass substrate) and the surface plates relative to each other by moving one or both of the upper surface plate and the lower surface plate.

(f) First Polishing Processing

First polishing is performed in order to remove blemishes and deformation and adjust minute unevenness (microwaviness, roughness) remaining on the main surfaces in the case where grinding with fixed abrasive particles is performed, for example. Specifically, the two main surfaces of the glass substrate (the intermediate glass substrate) are polished while the outer circumferential edge surface of the glass substrate (the intermediate glass substrate) is held in a holding hole provided in a carrier for polishing of a double-side polishing apparatus. It is preferable that the main surfaces of the glass substrate (the intermediate glass substrate) are mirror surfaces after the first polishing processing is performed.

In the first polishing processing, the glass substrate (the intermediate glass substrate) is polished using a double-side polishing apparatus having a configuration similar to that of the double-side grinding apparatus that is used in grinding processing with fixed abrasive particles, while a polishing liquid is provided. In the first polishing processing, unlike grinding with fixed abrasive particles, a polishing liquid containing loose abrasive particles is used, instead of fixed abrasive particles. Cerium oxide abrasive particles, cerium hydroxide abrasive particles, zirconia abrasive particles, zirconium silicate abrasive particles, or the like are used as loose abrasive particles used in first polishing, for example. In particular, in order to achieve a good polishing rate, it is preferable to use cerium oxide or zirconia, and it is most preferable to use cerium oxide as loose abrasive particles. If cerium oxide is used as loose abrasive particles, as will be described later, it is preferable to use cerium oxide having a predetermined broad particle size distribution that spreads toward the small particle diameter side such that the characteristics of the particle size distribution are unlikely to change even if a particle with a large particle diameter changes to a particle with a small particle diameter, in light of the fact that a stable polishing rate and polishing quality can be ensured.

(g) Chemical Strengthening Processing

In the chemical strengthening processing, the glass substrate (the intermediate glass substrate) is chemically strengthened by immersing the glass substrate (the intermediate glass substrate) in a chemical strengthening liquid. A melt in which potassium nitrate and sodium nitrate are mixed, for example, can be used as the chemical strengthening liquid.

(h) Second Polishing (Final Polishing) Processing

The second polishing processing is performed in order to mirror-polish the main surfaces of the glass substrate (the intermediate glass substrate). A double-side polishing apparatus having a configuration similar to that of the double-side polishing apparatus that is used in first polishing is used in second polishing as well. Specifically, two main surfaces of the glass substrate (the intermediate glass substrate) are polished while the outer circumferential edge surface of the glass substrate (the intermediate glass substrate) is held in a holding hole provided in a carrier for polishing of the double-side polishing apparatus. The machining allowance for second polishing is about 1 to 10 μm, for example. In the second polishing processing, the type and the particle size of loose abrasive particles are changed, and the hardness of a resin polisher is changed, with respect to the first polishing processing. Specifically, a polishing liquid containing silicon dioxide microparticles having a particle diameter of about 5 to 100 nm as loose abrasive particles is supplied between the polishing pads of the double-side polishing apparatus and the main surfaces of the glass substrate (the intermediate glass substrate), and the main surfaces of the glass substrate (the intermediate glass substrate) are polished. It is preferable that silicon dioxide microparticles are colloidal silica. The polished glass substrate (the intermediate glass substrate) is cleaned using a neutral detergent, pure water, isopropyl alcohol, or the like, and thus a magnetic-disk glass substrate that is a source of a magnetic disk (a glass substrate as a final product) can be obtained.

Carrying out the second polishing processing makes it possible to set the roughness (Ra) of the main surfaces thereof to 0.3 nm or less, and more preferably 0.1 nm or less. Also, microwaviness of the main surfaces can be set to 0.1 nm or less. In this manner, the glass substrate that was subjected to second polishing (a glass substrate as a final product) is cleaned and dried as appropriate to be a magnetic-disk glass substrate.

Then, a magnetic disk can be obtained by forming at least a magnetic layer on a surface of the magnetic-disk glass substrate.

(Loose Abrasive Particles)

Next, the particle size distribution of cerium oxide included as loose abrasive particles in the polishing liquid used in the above-described edge surface polishing processing of one embodiment will be described. The concentration of cerium oxide in the polishing liquid is 1 to 30 mass %, for example. The particle size distribution of loose abrasive particles can be obtained using a particle size distribution measurement apparatus with use of a laser diffraction/scattering method. In the cerium oxide particle size distribution, usually, the frequency is deviated toward the small particle diameter side, and thus, with regard to the horizontal axis (the particle diameter) when obtaining the particle size distribution, it is sufficient to convert the particle diameter into the logarithm, and plot the logarithm of the particle diameter on the horizontal axis. It is sufficient to then adjust a particle diameter range for classifying particle diameter ranges with the number of intervals between D5 to D95 being about 10 to 20.

According to one embodiment, the polishing liquid used in polishing processing further contains a predetermined dispersion medium (e.g., water) and loose abrasive particles dispersed in the dispersion medium, and further contains a dispersing agent for dispersing loose abrasive particles in the dispersion medium as needed.

D5 of cerium oxide included as loose abrasive particles in the polishing liquid of one embodiment is 1 μm or less, and the difference between D95 and D5 is 3 μm or more. Here, Dx [μm] refers to a particle diameter (the diameter of particles) when a cumulative particle volume cumulated from the small particle diameter side reaches x [%] of a total particle volume in a particle size distribution obtained using a laser diffraction/scattering method. In other words, Dx [μm] refers to the above-described predetermined particle diameter when the cumulative frequency obtained by cumulating the frequency from the minimum particle diameter of cerium oxide to the predetermined particle diameter thereof is x [%]. Thus, D100 refers to the maximum particle diameter in loose abrasive particles. Thus, D5 indicates the particle diameter that is relatively close to the minimum particle diameter, and D95 indicates the particle diameter that is close to the maximum particle diameter. Thus, D95 is larger than D5. When the difference between these two particle diameters is 3 μm or more, it means that the cerium oxide particle size distribution is broader than a conventional particle size distribution. Setting D5 to 1 μm or less makes it possible to ensure the quality of the polished inner and outer circumferential edge surfaces of a glass substrate (an intermediate glass substrate) in predetermined ranges.

Note that if D5 is less than 0.5 μm, there are cases where a polishing rate decreases because an excessively large number of abrasive particles with small diameters are present. Thus, D5 is more preferably 0.5 μm to 1 μm inclusive.

Also, it is preferable that the number of peaks of the relative frequency in the cerium oxide particle size distribution to be measured is two or less. If there are three or more peaks, there is a possibility that it will be difficult to manage a particle size distribution. Also, if there are two peaks, it is preferable that the peak on the large particle diameter side is higher than the other in light of the fact that a high polishing rate is obtained at the beginning of continuous polishing processing. If there are two peaks, the two peaks are preferably present in a particle diameter range of D10 to D85. Although, if the two peaks are present in this range, the polishing rate and polishing quality exhibit properties that are substantially equivalent to those when there is one peak, if a peak departs from this range, there are cases where the number of surface defects increases.

Also, the upper limit of the difference between D95 and D5 is preferably 10 μm, and more preferably 7 μm. If the difference therebetween is excessively large, there is a risk that the number of surface defects such as pits and scratches will increase.

Figure 1:
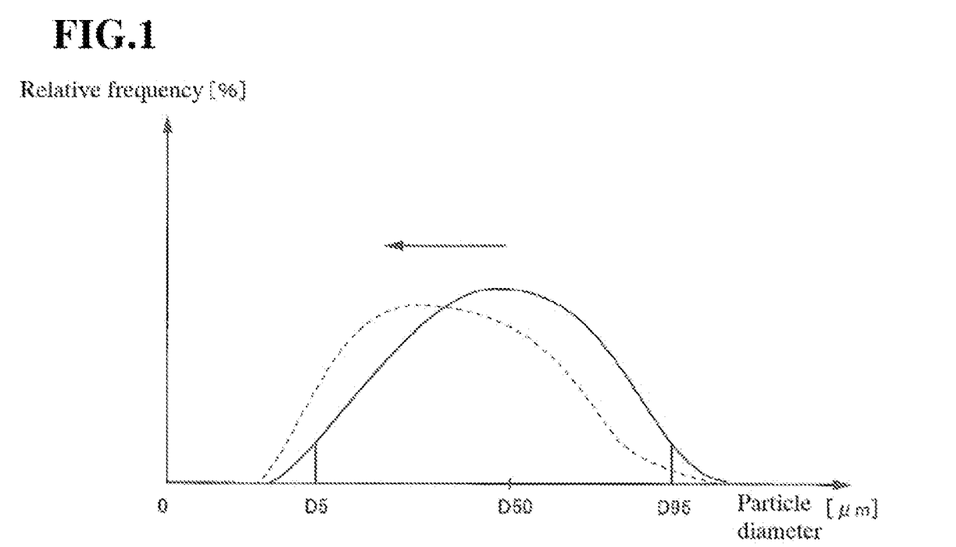
FIG. 1 is a schematic diagram showing one example of a particle size distribution of loose abrasive particles in one embodiment.
Figure 2:
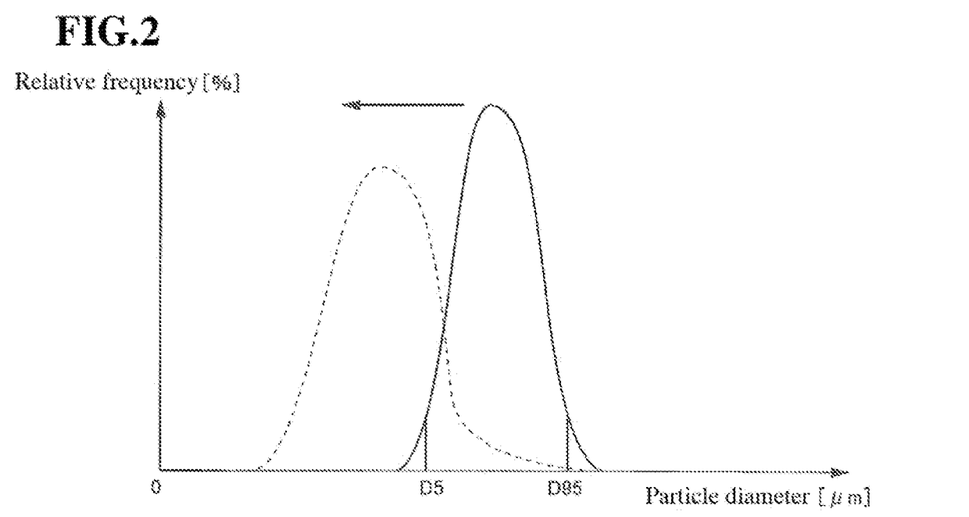
FIG. 2 is a schematic diagram showing one example of a particle size distribution of conventional loose abrasive particles.

FIG. 1 is a schematic diagram showing one example of a particle size distribution of loose abrasive particles in one embodiment, and FIG. 2 is a schematic diagram showing one example of a particle size distribution of conventional loose abrasive particles. The solid line indicates a particle size distribution of loose abrasive particles before polishing processing, and the broken line indicates a particle size distribution obtained after polishing processing is continuously performed on ten batches while circulating a polishing liquid, for example. The polishing liquid is not partially replenished or replaced during this processing.

D5 and D95 are shown in FIGS. 1 and 2. The particle size distribution indicated by the solid line in FIG. 1 is a broad distribution in which a particle diameter range is wider and the maximum value of the relative frequency (the value of the frequency when the frequency is at the maximum) is lower than those of the particle size distribution indicated by the solid line in FIG. 2, the distribution spreading on the small particle diameter side, compared to the particle size distribution shown in FIG. 2. If a polishing liquid containing loose abrasive particles having such a particle size distribution is continuously used in polishing processing, a portion of a large particle breaks through the polishing processing to split into two or more small particles, thus showing a particle size distribution as the distributions indicated by the broken lines in FIGS. 1 and 2. Specifically, the overall particle size distribution shifts in a direction toward the small particle diameter side from the particle size distribution indicated by the solid line. Although, as shown in FIGS. 1 and 2, the frequency of the particle diameter near the maximum particle diameter is reduced, as described above, particles that are unlikely to break are included therein, and thus the maximum particle diameter hardly decreases.

At this time, a range where the solid line and the broken line overlap each other is wide in the particle size distribution shown in FIG. 1, and a range where the solid line and the broken line overlap each other is narrow in the particle size distribution shown in FIG. 2. Thus, if the polishing liquid is used in polishing processing for a long time, a change in the polishing rate of the polishing liquid containing loose abrasive particles having the particle size distribution shown in FIG. 1 is smaller than that of the polishing liquid containing loose abrasive particles having the particle size distribution shown in FIG. 2.

In this case, a particle diameter Dpeak (mode particle diameter) at which the frequency is at the maximum in the above-described particle size distribution is preferably 1 μm or more. If the particle diameter Dpeak is less than 1 μm, there are cases where the polishing rate decreases from the beginning of use of the polishing liquid and the polishing processing time extends. Also, if the particle diameter Dpeak is excessively large, there are cases where surface defects on a surface to be polished increase, and thus the Dpeak is preferably 5 μm or less, and more preferably 3 μm or less. Also, D50 is preferably 0.8 to 2.4 μm in the light of inhibiting an overall change in the particle size distribution. Also, D100 (the maximum particle diameter) is preferably 15 μm or less in the light of reducing surface defects on a surface to be polished. Note that D100 is preferably 3 μm or more in the light of obtaining a broad particle size distribution. It is preferable that Dpeak–D5 is smaller than D95–Dpeak. Also, it is preferable that D50–D5 is smaller than D95–D50. The reasons for this are that, because large abrasive particles are gradually broken into small abrasive particles through polishing processing, when (Dpeak–D5)< (D95–Dpeak) holds true, a change in the particle size distribution thereof is likely to decrease overall. It is preferable that D50–D5 is smaller than D95–D50 due to the same reasons.

According to one embodiment, it is preferable that a difference between D95 and D5 is 4 μm or more. This makes it possible to further suppress a decrease in the polishing rate even if the polishing liquid is used for a long time.

According to one embodiment, it is preferable that D95 is 7 μm or less. This makes it possible to maintain the quality of the polished surface in an allowable range.

In one embodiment, when the polishing liquid is used in polishing processing for polishing edge surfaces of a glass substrate (a glass blank) with use of a brush, the polishing rate of the polishing liquid and a decrease in the quality of the polished surface can be further effectively inhibited. In the polishing of edge surfaces of a glass substrate (a glass blank) with use of a brush (brush polishing), a predetermined number of glass substrates (glass blanks) are stacked to produce a stacked body such that main surfaces of the glass substrates face each other, and side surfaces of the stacked body (outer circumferential edge surfaces or inner circumferential edge surfaces of the glass substrates (the glass blanks)) are collectively polished with use of the brush, for example. In the case of brush polishing, because leading ends of the brush are obliquely pressed against the surfaces to be polished in a bent or bundled state, gaps between the surfaces to be polished and the brush vary from a very small size to a relatively large size and are not uniform. As a result, abrasive particles with various particle diameters fit in appropriate gaps and exert polishing effects. That is, abrasive particles with various particle diameters are pressed against the surfaces thereof by the brush at the same time, and thus the width of the particle size distribution (the difference between D95 and D5) has a significant influence. From this point of view, a larger effect can be exhibited by applying the polishing liquid of this embodiment to brush polishing.

Examples of the material of the bristles constituting the brush include polyamide synthetic fibers, PBT (polybutylene terephthalate), and PP (polypropylene). The wire diameter of the bristle material is about 0.05 to 1 mm, for example.

Note that even in a case where soft polishing pads made of polyurethane foam or the like are used in order to polish surfaces of glass substrates (intermediate glass substrates), the pads may be in the same state as in brush polishing (the state in which abrasive particles with various particle diameters are pressed against the surfaces thereof by the polishing pads at the same time). Thus, even if soft polishing pads are used, the polishing liquid of this embodiment can be effectively used. In particular, swede polishing pads made of polyurethane foam are suitable because surface defects can be easily reduced due to the surfaces thereof being relatively soft.

Thus, as a result of performing polishing processing on glass substrates (glass blanks or intermediate glass substrates) with use of such a polishing liquid, the intermediate glass substrates, or glass substrates as final products, can be stably manufactured without frequently changing polishing processing conditions. Thus, it is possible to stably use the method for manufacturing a magnetic disk with which at least a magnetic layer is formed on main surfaces of the manufactured glass substrate.

Experimental Examples

In order to check the effects of the polishing liquid according to an embodiment, polishing liquids (with a concentration of cerium oxide being 10 mass %) obtained by changing a cerium oxide particle size distribution in various ways were produced, and outer circumferential edge surfaces of glass substrates (glass blanks) were subjected to edge surface polishing. This edge surface polishing is brush polishing with use of a brush. In this brush polishing, a polishing liquid was not replaced, and 20 batches were continuously processed while the polishing liquid was circulated, with polishing processing conditions (the number of stacked glass substrates (glass blanks), the polishing time, the concentration of a polishing liquid, and the pressing force of a brush) for one batch kept constant. The polishing rate for glass substrates (intermediate glass substrates) in the first batch and the polishing rate for glass substrates (intermediate glass substrates) in the twentieth batch were calculated, and a polishing rate ratio (the polishing rate in the twentieth batch/the polishing rate in the first batch) was obtained. The number of glass substrates (glass blanks) used in the first batch was 200. A 3.5-inch nominal size glass substrate (glass blank) having an outer circumferential diameter of 95 mm, a circular hole diameter of 25 mm, and a substrate thickness of 0.635 mm was used as the glass substrate (the glass blank). Note that the substrates whose outer circumferential edge surface and inner circumferential edge surface were formed such that chamfered surfaces thereof had an angle of 135 degrees with respect to the main surfaces thereof, and had a length of 150 μm in a direction parallel to the main surfaces and 150 μm in the substrate thickness direction were used.

The polishing rate is a value obtained by dividing, by the polishing time, a polishing amount obtained from the outer circumferential size of a glass substrate (a glass blank) obtained before and after processing for polishing the outer circumferential edge surface of the glass substrate. Cerium oxide loose abrasive particles were set such that D5 was fixed to 0.5 μm and the particle diameter D95 was changed. At this time, Dpeak for all cases was in a range of 1 to 5 μm. Also, D50 for all cases was in a range of 0.8 to 2.4 μm. Also, (Dpeak−D5)<(D95−Dpeak) held true, and (D50−D5)<(D95−D50) held true. Also, in a particle size distribution where the vertical axis thereof indicates a relative frequency, the relative frequency had two or less peaks, and in the case of two peaks, all peaks were in a range of D10 to D85 particle diameters.

Table 1 below shows the difference between D95 and D5 and the polishing rate ratio at that time.

TABLE 1

| | D95−D5 [μm] | Polishing rate ratio |
|---|---|---|
| Sample 1 | 1 | 0.65 |
| Sample 2 | 2 | 0.70 |
| Sample 3 | 3 | 0.81 |
| Sample 4 | 4 | 0.85 |
| Sample 5 | 7 | 0.91 |
| Sample 6 | 9 | 0.88 |
| Sample 7 | 11 | 0.87 |

According to the results shown in Table 1, it was found that, when D5 is 1 μm or less and the difference between D95 and D5 is 3 μm or more, the polishing rate ratio was as large as 0.80 or more, and there was no need to perform adjustment such as changing of the polishing time, for example. Note that it was also found that it is more preferable that the difference between D95 and D5 is 4 μm or more because the polishing rate ratio further increased to 0.85 or more in such a case.

Next, loose abrasive particles whose D95 was changed in a state in which D5 was fixed to 0.5 μm were produced, edge surface polishing was performed on 20 batches in a similar manner as that described above, and 5 glass substrates (intermediate glass substrates) were selected from the twentieth batch, and, with regard to the surface quality after the above-described edge surface polishing, surface defects of the outer circumferential edge surfaces were evaluated. Here, the specification regarding to Dpeak, D50, the number of peaks of the relative frequency in a particle size distribution of used cerium oxide was the same as that of cerium oxide used in Samples 1 to 7. In the above-described evaluations, the edge surfaces were visually observed using a digital microscope, and the number of defects such as pits and scratches was evaluated. The number of surface defects was evaluated on a scale of levels 1 to 3. The level 1 was a level at which there were few surface defects, the level 2 was a level at which surface defects were slightly observed, and the level 3 was a level at which many surface defects were observed. The levels 1 and 2 are an acceptable level for practical purpose.

TABLE 2

|  | D95 [μm] | Evaluation level for pits in polished surface |
|---|---|---|
| Sample 8 | 5 | Level 1 |
| Sample 9 | 6 | Level 1 |
| Sample 10 | 7 | Level 1 |
| Sample 11 | 8 | Level 2 |
| Sample 12 | 9 | Level 2 |
| Sample 13 | 10 | Level 2 |

According to the results shown in Table 2, it is found that D95 is preferably 7 μm or less in the light of the fact that, even if loose abrasive particles were repeatedly used in polishing processing for a long time, the quality of the polished surface can be maintained at a high level, and the number of defects of the polished surface was reduced, thus increasing the surface quality.

Next, outer circumferential edge surface polishing that was the same as that for Samples 1 to 7 shown in Table 1 was carried out using polishing liquids (Samples 14 to 18) containing cerium oxide with a particle size distribution in which (D95−D5) was fixed to 3 μm and D5 was changed in various ways, and the above-described polishing rate ratios were calculated. At this time, the specification regarding to Dpeak, D50, the number of peaks of the relative frequency in the cerium oxide particle size distribution was the same as that of cerium oxide used in Samples 1 to 7.

TABLE 3

|  | D5 [μm] | Polishing rate ratio |
|---|---|---|
| Sample 14 | 0.3 | 0.80 |
| Sample 15 | 0.5 | 0.81 |
| Sample 16 | 0.7 | 0.83 |
| Sample 17 | 1.0 | 0.82 |
| Sample 18 | 1.5 | 0.68 |

According to the results shown in Table 3, it is found that, if D5 exceeds 1 μm, the polishing rate ratio significantly deteriorates. It is inferred that this is because the number of particles that were very few in the first batch and had a particle diameter of 1 μm or less rapidly increased in the twentieth batch.

That is, from the results shown in Table 3, it is considered important to somewhat add abrasive particles having a particle diameter of 1 μm or less to a polishing liquid at the beginning of use with D5 being 1 μm or less, in order to suppress a change in the number of abrasive particles having a particle diameter of 1 μm or less.

As described above, although a polishing liquid, a method for manufacturing a glass substrate, and a method for manufacturing a magnetic disk according to the present invention have been described in detail, the present invention is not limited to the above-described embodiment and experimental examples and it will be appreciated that various improvements and modifications can be made without departing from the gist of the present invention.

One aspect of this disclosure is a polishing liquid that contains cerium oxide as loose abrasive particles and is to be used in polishing processing for polishing a surface of a glass substrate.

Letting a particle diameter be Dx [μm] when a cumulative particle volume cumulated from the small particle diameter side reaches x [%] of a total particle volume in a particle size distribution obtained regarding the cerium oxide using a laser diffraction/scattering method, D5 is 1 μm or less, and a difference between D95 and D5 is 3 μm or more.

It is preferable that the difference between the D95 and the D5 is 4 μm or more.

It is preferable that the D95 is 7 μm or less.

It is preferable to use the polishing liquid in polishing processing for polishing an edge surface of a glass substrate with use of a brush.

Another aspect of this disclosure is a method for manufacturing a glass substrate, the method including processing for polishing a surface of a substrate. The polishing in this manufacturing method is processing for polishing the glass substrate with use of the polishing liquid.

It is preferable that the glass substrate is a magnetic-disk glass substrate.

It is preferable that the magnetic-disk glass substrate has an outer circumferential diameter of 94 mm or more.

Yet another aspect of this disclosure is a method for manufacturing a magnetic disk, the method including processing for forming at least a magnetic layer on a main surface of the magnetic-disk glass substrate obtained using the glass substrate manufacturing method.

According to the above-described polishing liquid, even if the polishing liquid containing cerium oxide as loose abrasive particles is repeatedly used in polishing processing for polishing a glass substrate with use of the polishing liquid, a change in the polishing rate is slight, and it is possible to repeatedly use this polishing liquid in polishing processing for a long time. Thus, even if the above-described polishing liquid is repeatedly used in polishing processing, the frequency of changing the polishing processing conditions is low, and the same polishing liquid can be used in polishing processing for a long time. According to the above-described glass substrate manufacturing method and magnetic disk manufacturing method, polishing processing can be stably performed with use of the above-described polishing liquid, and thus it is possible to stably manufacture glass substrates and magnetic disks.

What is claimed is:

1. A polishing liquid that contains cerium oxide as loose abrasive particles and is to be used in polishing processing for polishing a surface of a glass substrate, wherein, letting a particle diameter be Dx (μm) when a cumulative particle volume cumulated from the small particle diameter side reaches x (%) of a total particle volume in a particle size distribution obtained regarding the cerium oxide using a laser diffraction/scattering method, D5 is 1 μm or less, a difference between D95 and the D5 is 3 μm or more, D50 is 0.8 to 2.4 μm, and Dpeak−D5 is less than D95−Dpeak, where the Dpeak is a particle diameter at which a frequency is at a maximum in the particle size distribution.

2. The polishing liquid according to claim 1, wherein the difference between the D95 and the D5 is 4 μm or more.

3. The polishing liquid according to claim 1,
wherein the D95 is 7 μm or less.

4. The polishing liquid according to claim 1,
wherein the particle size distribution of the cerium oxide shifts in a direction toward the small particle diameter side by use of the polishing liquid in the polishing processing.

5. The polishing liquid according to claim 1,
wherein the glass substrate is a magnetic-disk glass substrate.

6. A method for manufacturing a glass substrate, the method comprising:
processing for polishing an edge surface of the glass substrate with use of the polishing liquid according to claim 1.

7. A method for manufacturing a glass substrate, the method comprising:
processing for polishing a main surface of the glass substrate with use of the polishing liquid according to claim 1.

8. A polishing liquid that contains cerium oxide as loose abrasive particles and is to be used in polishing processing for polishing a surface of a glass substrate,
wherein, letting a particle diameter be Dx (μm) when a cumulative particle volume cumulated from the small particle diameter side reaches x (%) of a total particle volume in a particle size distribution obtained regarding the cerium oxide using a laser diffraction/scattering method,
D5 is 1 μm or less,
a difference between D95 and the D5 is 3 μm or more, and
Dpeak−D5 is less than D95−Dpeak, where the Dpeak is a particle diameter at which a frequency is at a maximum in the particle size distribution.

9. The polishing liquid according to claim 8,
wherein the difference between the D95 and the D5 is 4 μm or more.

10. The polishing liquid according to claim 8,
wherein the D95 is 7 μm or less.

11. The polishing liquid according to claim 8,
wherein the particle size distribution of the cerium oxide shifts in a direction toward the small particle diameter side by use of the polishing liquid in the polishing processing.

12. The polishing liquid according to claim 8,
wherein the glass substrate is a magnetic-disk glass substrate.

13. A method for manufacturing a glass substrate, the method comprising:
processing for polishing an edge surface of the glass substrate with use of the polishing liquid according to claim 8.

14. A method for manufacturing a glass substrate, the method comprising:
processing for polishing a main surface of the glass substrate with use of the polishing liquid according to claim 8.

15. A polishing liquid that contains cerium oxide as loose abrasive particles and is to be used in polishing processing for polishing a surface of a glass substrate,
wherein, letting a particle diameter be Dx (μm) when a cumulative particle volume cumulated from the small particle diameter side reaches x (%) of a total particle volume in a particle size distribution obtained regarding the cerium oxide using a laser diffraction/scattering method,
D5 is 1 μm or less,
a difference between D95 and the D5 is 3 μm or more,
D50 is 0.8 to 2.4 μm, and
Dpeak is 3 μm or less, where the Dpeak is a particle diameter at which a frequency is at a maximum in the particle size distribution.

16. A method for manufacturing a glass substrate, the method comprising:
processing for polishing the surface of the glass substrate with use of the polishing liquid according to claim 15.

* * * * *